(12) United States Patent
McCall et al.

(10) Patent No.: US 7,697,002 B2
(45) Date of Patent: Apr. 13, 2010

(54) VARYING HAND-DRAWN LINE WIDTH FOR DISPLAY

(75) Inventors: M. Kim McCall, Menlo Park, CA (US); Kurt W. Piersol, Campbell, CA (US)

(73) Assignee: Ricoh Co. Ltd., Tokyo (JP)

( * ) Notice: Subject to any disclaimer, the term of this patent is extended or adjusted under 35 U.S.C. 154(b) by 443 days.

(21) Appl. No.: 11/626,995

(22) Filed: Jan. 25, 2007

(65) Prior Publication Data

US 2008/0180410 A1 Jul. 31, 2008

(51) Int. Cl.
*G06T 11/00* (2006.01)
(52) U.S. Cl. .................. 345/467; 715/263; 715/268
(58) Field of Classification Search .............. 715/263, 715/268; 345/467
See application file for complete search history.

(56) References Cited

U.S. PATENT DOCUMENTS

| | | | | | |
|---|---|---|---|---|---|
| 5,434,959 | A | * | 7/1995 | Von Ehr et al. | 345/441 |
| 5,594,855 | A | * | 1/1997 | Von Ehr et al. | 345/442 |
| 5,611,036 | A | * | 3/1997 | Berend et al. | 345/441 |
| 5,796,866 | A | * | 8/1998 | Sakurai et al. | 382/187 |
| 6,587,587 | B2 | * | 7/2003 | Altman et al. | 382/181 |
| 6,909,430 | B2 | * | 6/2005 | Dresevic et al. | 345/443 |
| 2003/0024748 | A1 | | 2/2003 | Dresevic et al. | |
| 2003/0214490 | A1 | * | 11/2003 | Cool | 345/179 |
| 2003/0215145 | A1 | * | 11/2003 | Shilman et al. | 382/195 |
| 2004/0066378 | A1 | | 4/2004 | Dresevic et al. | |
| 2005/0073508 | A1 | * | 4/2005 | Pittel et al. | 345/175 |
| 2005/0162413 | A1 | | 7/2005 | Dresevic et al. | |

* cited by examiner

*Primary Examiner*—Michelle K Lay
(74) *Attorney, Agent, or Firm*—Fenwick & West LLP

(57) ABSTRACT

The present invention overcomes the deficiencies of the prior art with a system for varying hand-drawn line width as a function of geometric or temporal properties such as curvature or time of the strokes as the user draws them. In one embodiment, the system of the present invention includes a stroke control module, a velocity adjustment module, a curvature adjustment module, a smoothing module, an adjacency verification module and a stroke dominance module. A stroke control module is operable on a processor to modify the width of input strokes and adjust them based on their curvature and/or the velocity at which they were received. The stroke control module cooperates with and controls the velocity adjustment module, a curvature adjustment module, the smoothing module and the other modules to provide overall width adjustment of strokes input by the user automatically to reflect the needs and intentions of the user and provide a natural-feeling drawing experience similar to that provided by paper.

27 Claims, 14 Drawing Sheets

VARYING HAND-DRAWN LINE WIDTH FOR DISPLAY

BACKGROUND OF THE INVENTION

The invention relates to techniques for displaying hand-drawn lines by a display device. More particularly, the present invention relates to systems and method for varying the size of strokes displayed by a computing device to reflect the needs and intentions of the user.

There have been a number of attempts in recent years to increase the adoption rate for pen-based computing devices. A number of laptop computers now include a stylus and displays that allows users to interact with the computer using the stylus in place of the mouse for cursor control and stroke capture. Recently, handheld computing devices such as smart phones and personal digital assistants (PDA) have also started to incorporate stylus/tablet type interfaces.

One consistent problem with stylus-based tablets is that the user experience with the stylus and tablet does not match the experience one has when interacting with a writing instrument and paper. In particular, the strokes captured by the tablet and presented back to the user typically do not have any dimensions. In contrast, when a user writes on paper, the user employs pressure and a pencil angle to affect the width of the strokes drawn. But detecting angled pressure in a stylus-based tablet system is difficult and expensive. It requires both a complicated stylus and a complicated detection and reporting system. Such requirements for sophisticated stylus and reporting systems make such systems cost prohibitive.

The inability of the prior art systems to be able to render strokes that have an appropriate width has significantly diminished the user experience and the adoption rate of such stylus-based tablets. Users tend to feel a need to write in larger strokes than they would like to in order to preserve readability, including the usual ratios of ink-filled space to empty space within and between characters and lines and this is due in part to the inability of the prior art to render lines with varying widths. Especially when taking notes, it is frustrating for the user to be unable to write characters as small as they can on paper. In contrast, when drawing circles, arrows and boxes, the user wants them to be easily viewed from a distance and desires fairly broad strokes. However, the prior art does not provide an ability to manage and modify stroke width to reflect user intentions.

SUMMARY OF THE INVENTION

The present invention overcomes the deficiencies of the prior art with a system for varying hand-drawn line width as a function of geometric or temporal properties such as curvature or speed of the strokes as the user draws them. In one embodiment, the system of the present invention includes a stroke control module, a velocity adjustment module, a curvature adjustment module, a smoothing module, an adjacency identification module and a stroke dominance module. A stroke control module is operable on a processor to modify the width of input strokes and adjust them based on their curvature and/or the velocity at which they were received. The stroke control module cooperates with and controls the velocity adjustment module, a curvature adjustment module, the smoothing module and the other modules to provide overall width adjustment of strokes input by the user automatically to reflect the needs and intentions of the user and provide a natural-feeling drawing experience much more like that provided by paper.

The present invention also includes a number of novel methods including: a method for varying hand-drawn line widths, a method for adjusting line width for curvature, a method for adjusting line width for velocity, a method for smoothing line segments, a method for computing dominance of the group in an area and a method for determining adjacency groups.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
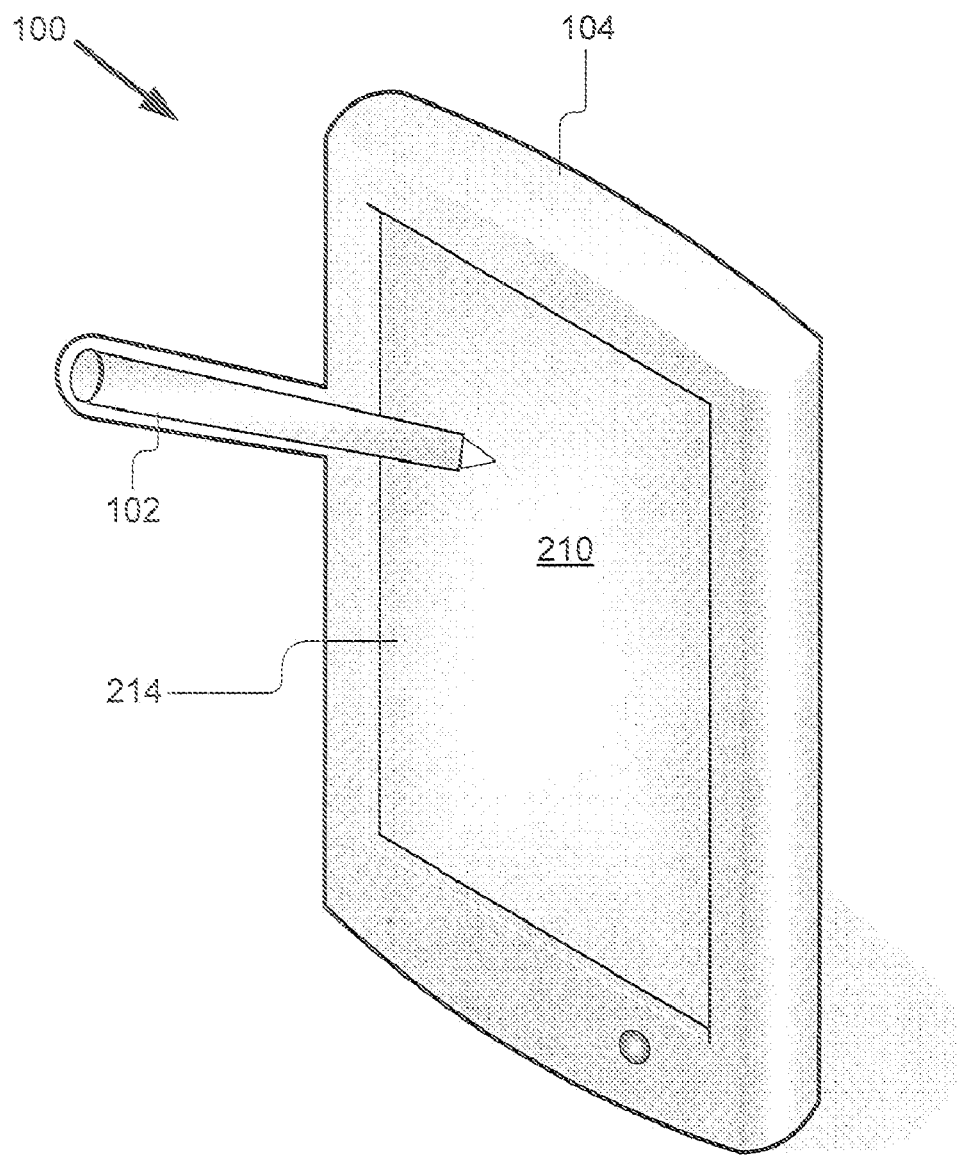
FIG. 1 illustrates an embodiment of a system including stylus and digitizing tablet of the present invention.

A system and methods for varying hand-drawn line width for display are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to a stylus and tablet computing device. However, the present invention applies to any type of pen-based computing device regardless of portability or size.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System

FIG. 1 shows an example of a system 100 including a stylus 102 and a tablet or computing device 104 upon which an embodiment of the present invention is operable. The tablet or computing device 104 includes a display 210 for presenting images, text, data including representation of strokes to the user. The tablet or computing device 104 also includes a touch screen or digitizer 214 for determining the position of a finger or stylus, respectively. The digitizer 214 may be active or passive or similar technology as will be understood by those skilled in the art.

Figure 2:
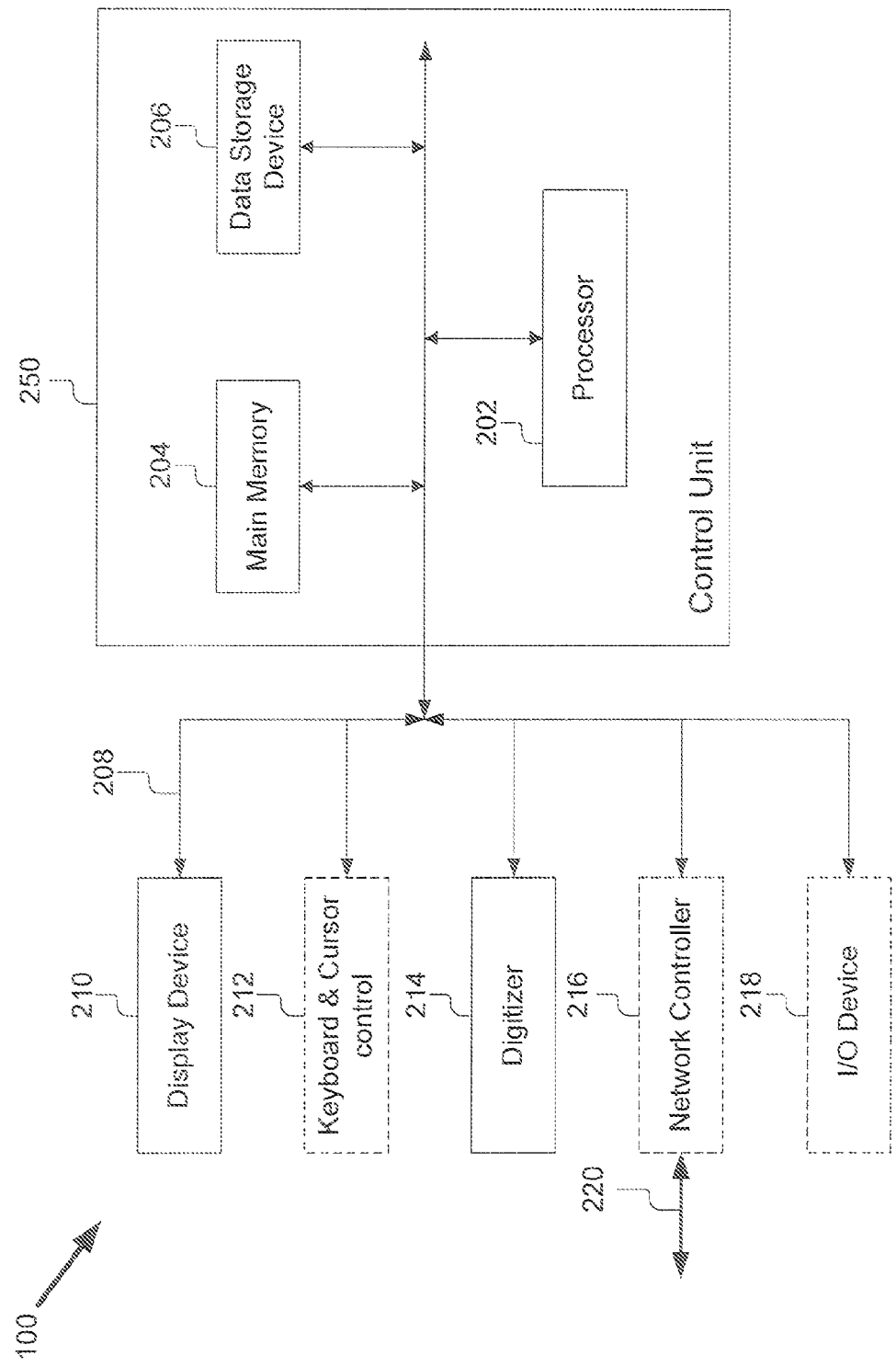
FIG. 2 illustrates a block diagram of a system configured in accordance with an embodiment of the present invention.

Referring now also to FIG. 2, a functional block diagram of the system 100 configured in accordance with an embodiment of the present invention is shown. The system 100 preferably comprises a control unit 250, a display device 210 and a digitizer 214. The system 100 may optionally include a keyboard & cursor control 212, a network controller 216 and one or more input/output (I/O) devices 218.

The control unit 250 comprises an arithmetic logic unit, a microprocessor, a general purpose computer or some other information appliance equipped to provide electronic display signals to display device 210. In one embodiment, the control unit 250 comprises a general purpose computer having a graphical user interface, which may be generated by, for example, a program written in Java running on top of an operating system like WINDOWS® or UNIX® based operating systems. In one embodiment, one or more application programs are executed by control unit 250 including, without limitation, graffiti, drawing applications, note pad applications, word processing applications, electronic mail applications, financial applications and web browser applications.

Still referring to FIG. 2, the control unit 250 is shown including processor 202, main memory 204, and data storage device 206, all of which are communicatively coupled to system bus 208.

Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 204 stores instructions and/or data that may be executed by processor 202. The instructions and/or data may comprise code for performing any and/or all of the techniques described herein. Main memory 204 may be a dynamic random access memory (DRAM) device, a static random access memory (SRAM) device, or some other memory device known in the art. The memory 204 is described in more detail below with reference to FIG. 3.

Data storage device 206 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 208 represents a shared bus for communicating information and data throughout control unit 250. System bus 208 may represent one or more buses including an industry standard architecture (ISA) bus, a peripheral component interconnect (PCI) bus, a universal serial bus (USB), or some other bus known in the art to provide similar functionality. Additional components coupled to control unit 250 through system bus 208 include the display device 210, the keyboard & cursor control device 212, the digitizer 214, the network controller 216 and the I/O device(s) 218.

Display device 210 represents any device equipped to display electronic images and data as described herein. Display device 210 may be, for example, a liquid crystal display (LCD), a cathode ray tube (CRT) or any other similarly equipped display device, screen or monitor. In one embodiment, display device 210 is equipped with a touch screen and/or includes a digitizer 214 in which a touch-sensitive, transparent panel covers the screen of display device 210.

The digitizer 214 or graphics tablet is a conventional type of device that consists of a flat surface upon which the user may "draw" an image using a pen-like drawing apparatus and which produces signals that can be decoded to be coordinate information. The digitizer 214 or graphics tablet can be any one of the conventional types included as part of tablet personal computers and other devices.

As denoted by dashed lines, the system 100 may optionally include the keyboard & cursor control device 214, the network controller 216 and one or more input/output (I/O) devices 218 such as described below.

Keyboard 212 represents an alphanumeric input device coupled to control unit 250 to communicate information and command selections to processor 202. The Keyboard 212 can be a QWERTY keyboard, a key pad, or representations of such created on a touch screen. Cursor control 212 represents a user input device equipped to communicate positional data as well as command selections to processor 202. Cursor control 212 may include a mouse, a trackball, a stylus, a pen, a touch screen, cursor direction keys or other mechanisms to cause movement of a cursor.

Network controller 216 links control unit 250 to a network 220 that may include multiple processing systems. The network of processing systems may comprise a local area network (LAN), a wide area network (WAN) (e.g., the Internet), and/or any other interconnected data path across which multiple devices may communicate. The control unit 250 also has other conventional connections to other systems such as a network for distribution of files (media objects) using standard network protocols such as TCP/IP, http, https, and SMTP as will be understood to those skilled in the art.

One or more I/O devices 218 are coupled to the system bus 208. These I/O devices may be part of system 100 in one embodiment and in another embodiment are part of the other systems (not shown). For example, the I/O device 218 can include an image scanner for capturing an image of a document. The I/O device 218 also includes a printer for generating documents. The I/O device 218 may also include audio input/output device equipped to receive audio input via a microphone and transmit audio output via speakers. In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that system 100 may include more or fewer components than those shown in FIG. 2 without departing from the spirit and scope of the present invention. For example, system 100 may include additional memory, such as, for example, a first or second level cache, or one or more application specific integrated circuits (ASICs). Similarly, additional components input/output devices 218 may be coupled to control unit 250 including, for example, an RFID tag reader, digital still or video cameras, or other devices that may or may not be equipped to capture and/or download electronic data to control unit 250. One or more components could also be eliminated such as the keyboard & cursor control 212.

Figure 3:
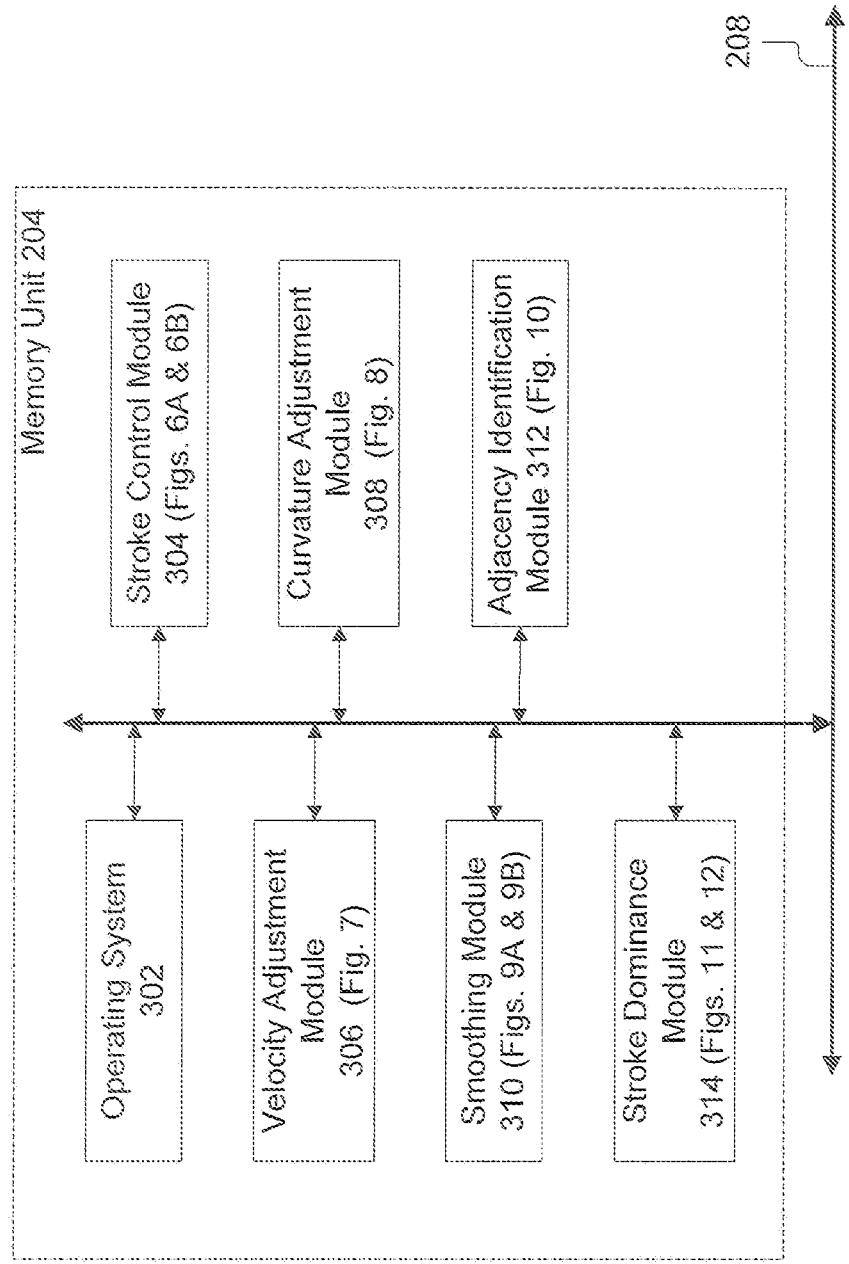
FIG. 3 illustrates a block diagram of a memory of the computer of FIG. 2 configured in accordance with an embodiment of the present invention.

FIG. 3 is a block diagram of one embodiment of the memory unit 204 for the system 100. The memory unit 204 preferably comprises: an operating system 302, a stroke control module 304, a velocity adjustment module 306, a curvature adjustment module 308, a smoothing module 310, an adjacency identification module 312 and a stroke dominance module 314. Those skilled in the art will recognize that the memory 204 also includes buffers for storing stroke, segment and capture data although not specifically shown. As noted above, the memory unit 204 stores instructions and/or data that may be executed by processor 202. The instructions and/or data comprise code for performing any and/or all of the techniques described herein. These modules 302-314 are coupled by bus 208 to the processor 202 for communication and cooperation with system 100. Those skilled in the art will recognized that while the present invention will now be described as modules or portions of a memory unit 204 of a computer system 100, the modules or portions thereof may also be stored in other media such as permanent data storage device 206 and may be distributed across a network 104 having a plurality of different computers such as in a client/server environment.

The operating system 302 is preferably one of a conventional type such as, WINDOWS®, SOLARIS® or LINUX® based operating systems. Although not shown, the memory unit 204 may also include one or more application programs including, without limitation, drawing applications, word processing applications, electronic mail applications, financial applications and web browser applications.

The stroke control module 304 is used to control the other modules of the memory 204. The stroke control module 304 is adapted for communication with the velocity adjustment module 306, the curvature adjustment module 308, the smoothing module 310, the adjacency identification module 312 and the stroke dominance module 314. The operation of the stroke control module 304 will be apparent from the description of FIGS. 6A and 6B below. Once the processing by the other modules is complete, the stroke control module 304 also generates and cause the modified stroke to by presented on the display device 210. While the stroke control module 304 is shown as a separate module of the memory 204, those skilled in the art will recognize that the stroke control module 304 in another embodiment may be distributed as routines in the other modules 306-314.

The velocity adjustment module 306 is software and routines for modifying the stroke width to account for the velocity at which the user drew the stroke. In one embodiment, the velocity that the stylus 102 was traveling when it laid down the segment is used as the measure of stroke or segment velocity. The operation of the velocity adjustment module 306 is described in more detail below with reference to FIG.

7. In general, the velocity adjustment module 306 modifies the width of the stroke such that the greater its velocity the greater its width.

The curvature adjustment module 308 is software and routines for modifying the stroke width to account for the curvature of the stroke or segment. In one embodiment, the curvature of a segment and the segments near it are used to modify the width of the line. The operation of the curvature adjustment module 308 is described in more detail below with reference to FIG. 8. In general, the curvature adjustment module 308 modifies the width of the stroke such that the less the curvature the greater its width.

The smoothing module 310 is software and routines for modifying the stroke width to smooth the entire stroke. In one embodiment, all the strokes and segment are passed through smoothing routines during and initial phase so that artifacts introduced during the detection process are minimized. This is typically pre processing of the stroke data before it is processed by the other modules 304-314 of the memory. In another embodiment, the smoothing module 310 smoothes the end segments and the interior segments. This smoothing is accomplished by ensuring the width of adjacent segments does not vary greatly by enforcing maximum changes between the widths of adjacent segments. This eliminates the visual impact of transitions between segments. The operation of the smoothing module 310 is described in more detail below with reference to FIGS. 9A and 9B.

The adjacency identification module 312 is software and routines for identifying short strokes and their adjacency to other strokes and adjusting their width because of their adjacency to other strokes. In general, to make the appearance of the strokes as close to conventional handwriting as possible this module ensures that strokes in a predefined proximity to each other will have widths that are sized consistent with the other strokes. The operation of the adjacency identification module 312 is described in more detail below with reference to FIG. 10.

The stroke dominance module 314 is software and routines for determining areas that have a high number of strokes. In such high density areas, the stroke width is modified in a different manner consistent with the stroke dominance. The stroke dominance module 314 identifies such areas and determines what strokes fall within such areas, and how they are processed differently or additionally. The operation of the stroke dominance module 314 is described in more detail below with reference to FIGS. 11 and 12.

Sample Strokes

Figure 4A:
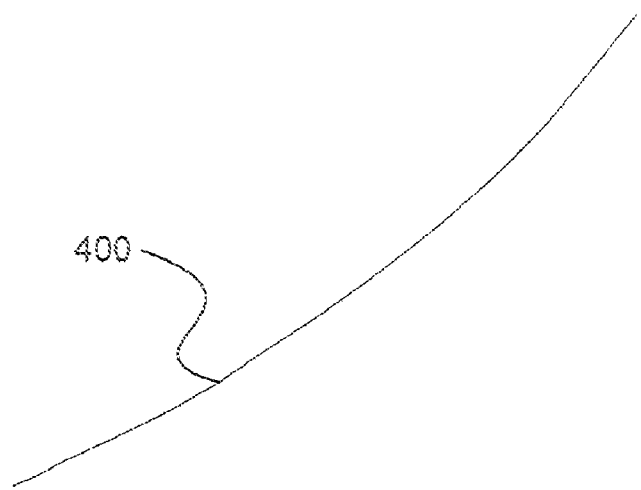
FIG. 4A is a graphical representation of a display of a stroke unmodified as in the prior art.

Referring now to FIG. 4A, an example stroke 400 unmodified as in the prior art is shown. Using the data captured by the digitizer 214 produces the line 400 with a consistent width. As can be seen, there is no variance whatsoever in the line width. Referring now also to Table 1 below, the data generated by the digitizer 214 and processed in a conventional manner is shown in the columns denoted "Event," "X," "Y" and "Time."

TABLE 1

| | SPEED ADJUSTED | | | | |
|---|---|---|---|---|---|
| Event | X | Y | Time | D | D/T |
| MouseDown | 100 | 300 | 0 | | |
| MouseDrag | 106 | 296 | 80 | 7.50 | 94 |
| MouseDrag | 112 | 293 | 160 | 6.50 | 31 |
| MouseDrag | 117 | 291 | 240 | 5.15 | 64 |
| MouseDrag | 121 | 289 | 320 | 4.47 | 56 |
| MouseDrag | 127 | 286 | 400 | 7.16 | 89 |

TABLE 1-continued

| | SPEED ADJUSTED | | | | |
|---|---|---|---|---|---|
| Event | X | Y | Time | D | D/T |
| MouseDrag | 135 | 283 | 280 | 8.54 | 107 |
| MouseDrag | 145 | 278 | 560 | 10.51 | 131 |
| MouseDrag | 158 | 272 | 640 | 14.32 | 179 |
| MouseDrag | 171 | 266 | 720 | 14.32 | 179 |
| MouseDrag | 185 | 258 | 800 | 16.56 | 219 |
| MouseDrag | 200 | 249 | 880 | 17.49 | 219 |
| MouseDrag | 240 | 225 | 960 | 46.91 | 586 |
| MouseDrag | 307 | 175 | 1040 | 82.90 | 1036 |
| MouseDrag | 333 | 135 | 1120 | 47.98 | 600 |
| MouseUP | 379 | 100 | 1200 | 57.40 | 718 |

Figure 4B:
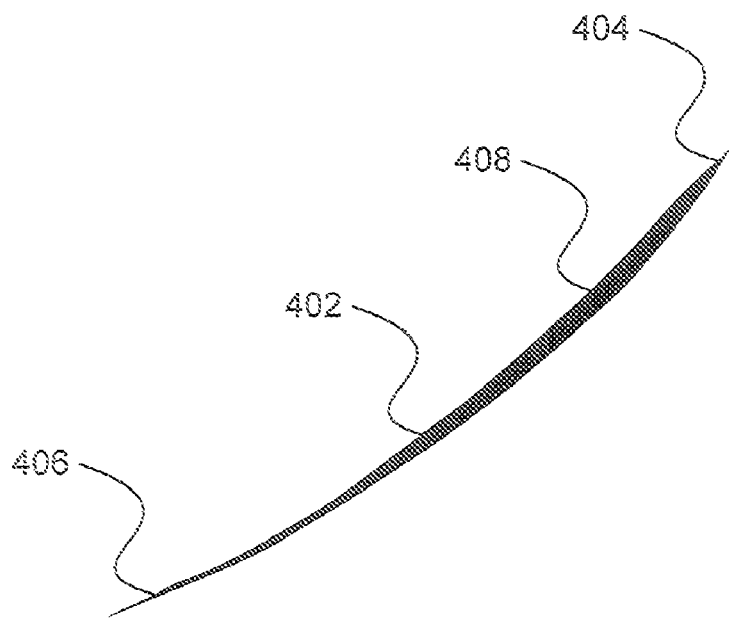
FIG. 4B is graphical representation of a display of a stroke adjusted for velocity in accordance with an embodiment of the present invention.

Referring now to FIG. 4B, a stroke 402 generated by the system 100 of the present invention is shown. In addition to the parameters used by the prior art, the present invention also used the velocity, for example as provided in column denoted "D/T" to modify the stroke width. As shown, the width of the stroke 402 is modified to a greater thickness at a point 408 where velocity is the greatest. FIG. 4B also illustrates how the system 100 and methods of the present invention taper the ends 404, 406 of the stroke in additional processing based on stroke velocity as will be described below with reference to FIGS. 6A and 6B.

Figure 5A:
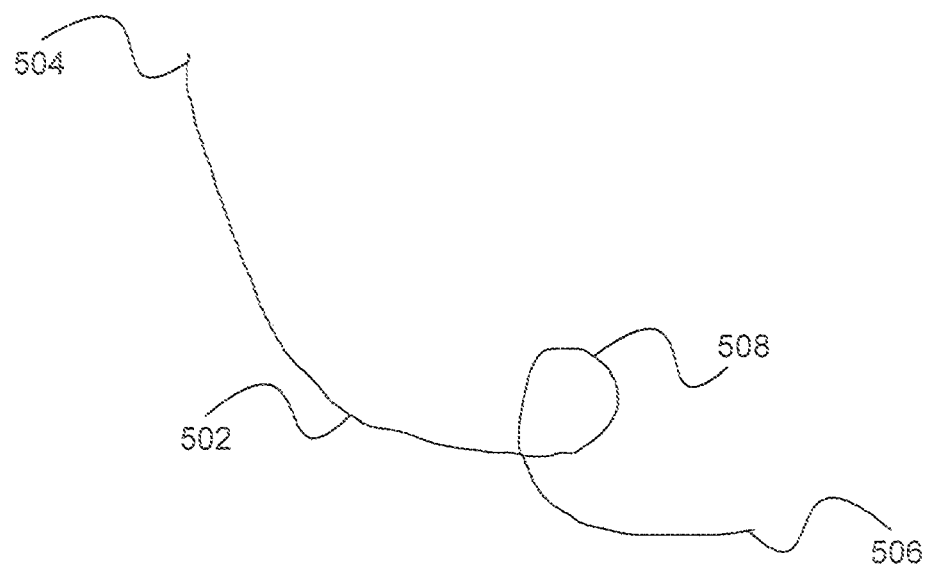
FIG. 5A is graphical representation of a display of a stroke unmodified as in the prior art.

FIG. 5A is graphical representation of a display of another example stroke unmodified as in the prior art. Using the data captured by the digitizer 214 produces the line 502 with a consistent width. As can be seen, there is no variance whatsoever in the line width whether it be at the ends 504, 506 of the stroke 502 or in a highly curved section 508. Referring now also to Table 2 below, the data generated by the digitizer 214 and processed in a conventional manner is shown in the columns denoted "Event," "X," "Y" and "T(ms)."

TABLE 2

| | CURVE ADJUSTED | | |
|---|---|---|---|
| Event | X | Y | T(ms) |
| MouseDown | 100 | 100 | 0 |
| MouseDrag | 99 | 116 | 80 |
| MouseDrag | 102 | 134 | 160 |
| MouseDrag | 110 | 163 | 240 |
| MouseDrag | 116 | 181 | 320 |
| MouseDrag | 124 | 203 | 400 |
| MouseDrag | 134 | 226 | 480 |
| MouseDrag | 149 | 246 | 560 |
| MouseDrag | 174 | 259 | 640 |
| MouseDrag | 200 | 266 | 720 |
| MouseDrag | 221 | 270 | 800 |
| MouseDrag | 243 | 262 | 880 |
| MouseDrag | 252 | 249 | 960 |
| MouseDrag | 242 | 226 | 1040 |
| MouseDrag | 223 | 226 | 1120 |
| MouseDrag | 219 | 242 | 1200 |
| MouseDrag | 216 | 260 | 1280 |
| MouseDrag | 223 | 282 | 1360 |
| MouseDrag | 237 | 296 | 1440 |
| MouseDrag | 256 | 302 | 1520 |
| MouseDrag | 285 | 302 | 1600 |
| MouseRelease | 300 | 300 | 1680 |

Figure 5B:
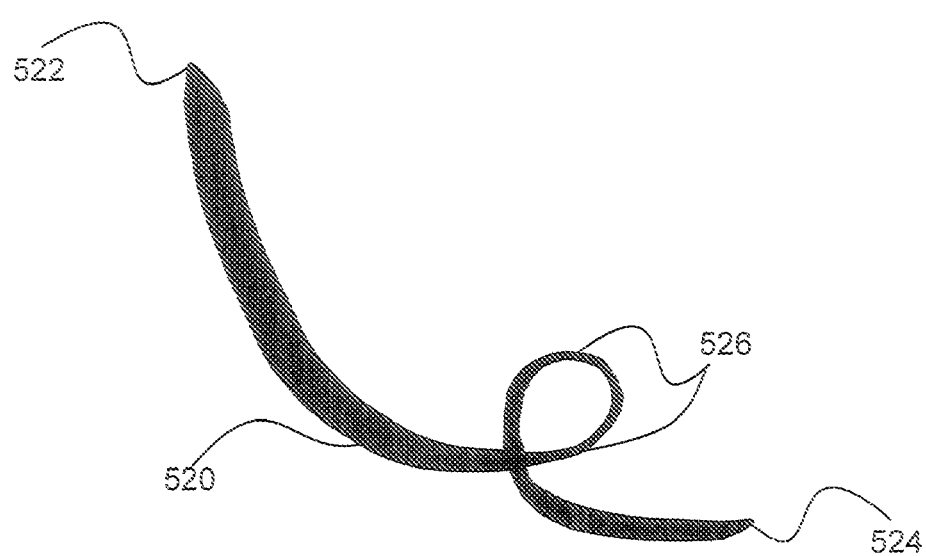
FIG. 5B is graphical representation of a display of a stroke adjusted for curvature in accordance with an embodiment of the present invention.

FIG. 5B is graphical representation of a display of a stroke 520 adjusted for curvature in accordance with an embodiment of the present invention. As can be seen the width of the stroke 520 varies greatly depending on the curvature of the segment. The more curved section 526 of the line has reduced width, and the ends 522, 524 are tapered by the system 100 and method of the present invention.

Methods

Figure 6A:
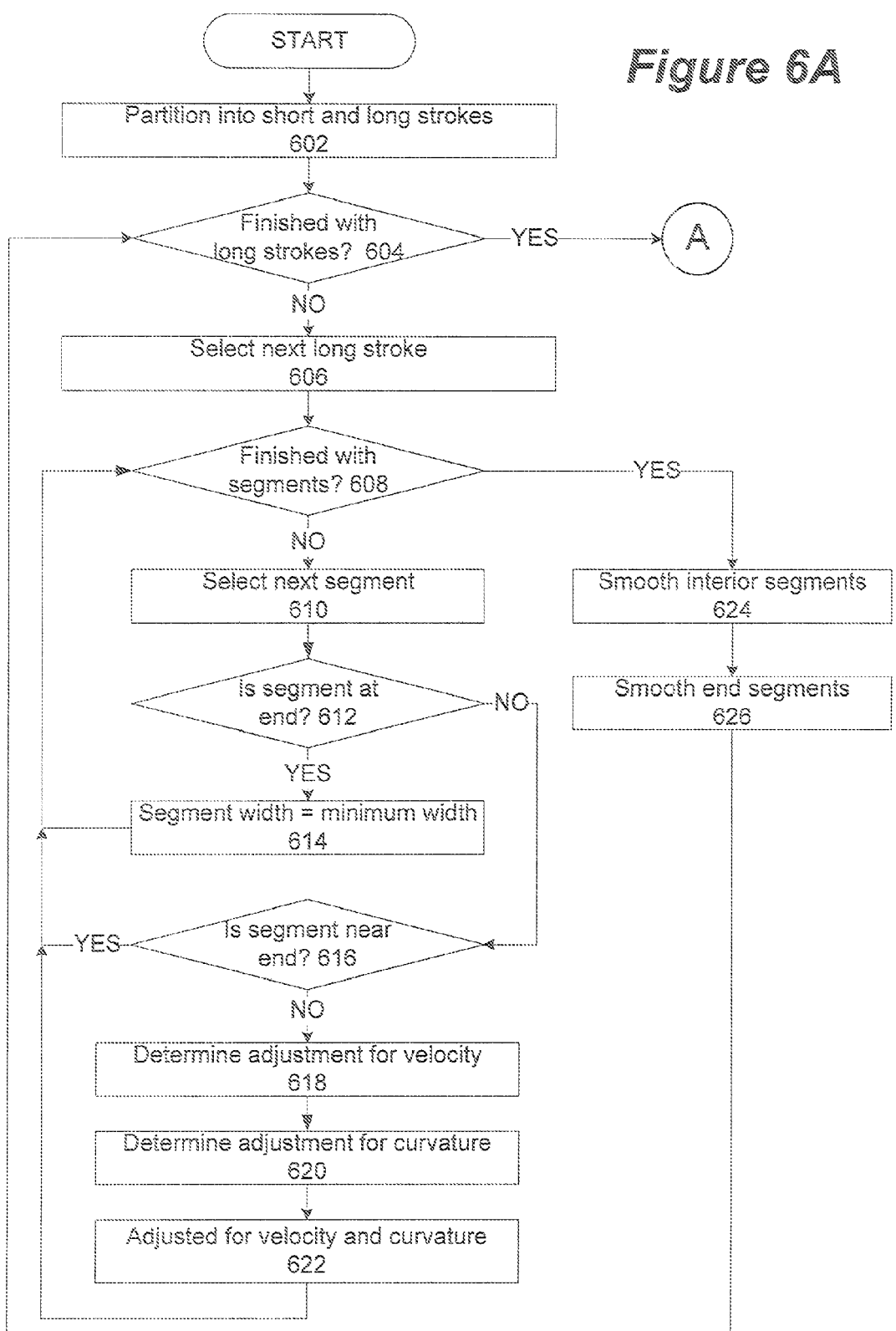
FIGS. 6A and 6B are a flowchart of an embodiment of a method for varying hand-drawn line width for display in accordance with the present invention.
Figure 6B:
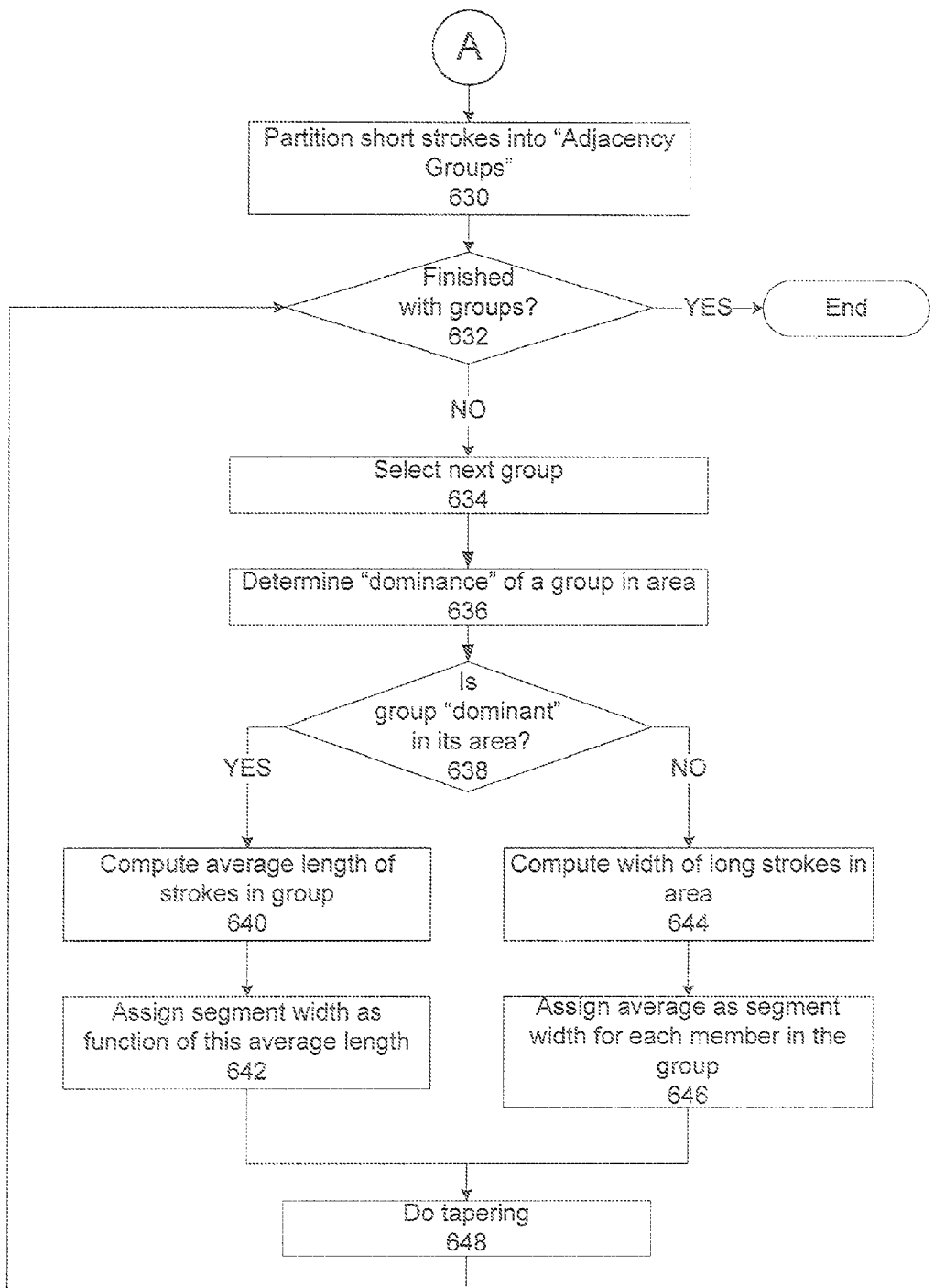

Referring now to FIGS. 6A and 6B, an embodiment of a method for varying hand-drawn line width for display in accordance with the present invention will be described. The process begins by partitioning 602 strokes into short strokes and long strokes. In one embodiment, the strokes are separated into long and short strokes based on length and time. In one embodiment short strokes are those that take less than 0.4 seconds to draw or cover less than twenty pixels in distance. Next, the method determines 604 whether processing of the long strokes is complete. If so the method continues in a process that will be described below in conjunction with FIG. 6B. If there are additional long strokes to process, the method then selects 606 the next long stroke. Each long stroke is analyzed by processing the segments that comprise the long stroke in sequence. The method determines 608 whether all the segments of the selected stroke had been processed. If so, the method proceeds to step 624 to smooth the interior segments. This process will be described below in more detail with reference to FIG. 9A. The method then smoothes 626 the end segments. This process will be described below with reference to FIG. 9B. After step 626, the method returns to step 604 to determine whether additional long strokes that need to be processed.

If in step 608, the method was not finished processing segments then a next segment is selected 610. The method then tests 612 whether the selected segment is an end segment. If so, the method sets 614 the segment width to be the minimum width, and then returns to step 608 to determine whether there are any additional segments to process. On the other hand, if the segment is determined not to be an end segment in step 612, the method determines 616 whether the segment is near the end. If the segment is near the end, the process does not assign the segment a width at this point. This will be handled by a later smoothing step 624, 626. The process returns to step 608 to determine whether there are any additional segments to process. If the segment is not near the end, the method determines 618 an adjusted segment width based on velocity. The process for modifying segment width based on velocity will be described in more detail below with reference to FIG. 7. Then the method determines 620 an adjusted segment width based on curvature. The process for modifying segment width based on curvature will be described in more detail below with reference to FIG. 8. Once the appropriate adjustments for velocity and curvature have been determined, the process modifies 622 the segment width. In one embodiment, the segment width is modified based on velocity. In another embodiment, the segment width is modified based on curvature. In yet another embodiment the segment width is modified based on both velocity and curvature. For example, the width for the segment could be set to be a value of a width modified for velocity times a weight plus a width modified for curvature times one minus the weight. After the width of the segment has been modified 622 for velocity and/or curvature, the method continues in step 608 to determine whether it is finished processing the segments of the current stroke.

Referring now to FIG. 6B, the method for processing short strokes will be described. The method transitions from step 604 to step 630 where the processing of short strokes begins. The method first partitions 630 the short strokes into "adjacency groups." The present invention advantageously sets the width of strokes that are temporally or physically nearby other strokes to have similar widths. This is accomplished in part by dividing the short strokes into adjacency groups and processing them together. This process will be described in more detail below with reference to FIG. 11. For example, if the stroke is especially short, it is handled specially. The dot over the "i" should have approximately the same width as does the "i" itself. The method next determines 632 whether it is finished processing the adjacency groups. If so, the method is complete and ends. If not however, the method selects 634 the next group for processing. Then the method determines 636 the "dominance" of a group in an area. The "dominance" of a group in an area provides input as to how much weight the width of strokes in this area should be given in setting the width for this selected group of strokes. A method for determining stroke dominance is described below with reference to FIG. 10. The method then determines whether the selected group of strokes is "dominant" in its area. In essence, the method determines whether there are a lot of short strokes in a given area. If not, the method is going to adjust the width of the short strokes to match the long strokes in the area. The method accomplishes this by computing 644 the width of long strokes in the area and assigning 646 the average of those widths as a segment width for each of the short strokes that is a member of the group. If it is determined that this group of short strokes is dominant in the area in step 638, the method transitions to compute 640 the average length of the short strokes in the group & sets 642 the segment width for the short strokes in the group to be a function of this average length. After step 646 or 642, the method continues to step 648 where minimal tapering on the short strokes is performed. The present invention advantageously slightly tapers the start and the end of the stroke, simulating the effect of a gradual application and release of pressure when the user starts or stops writing. In one embodiment, the tapering use of time delta for tapering at the beginning and end of strokes. After step 648 the method returns to step 632 to determine whether it is finished processing groups of short strokes.

Figure 7:
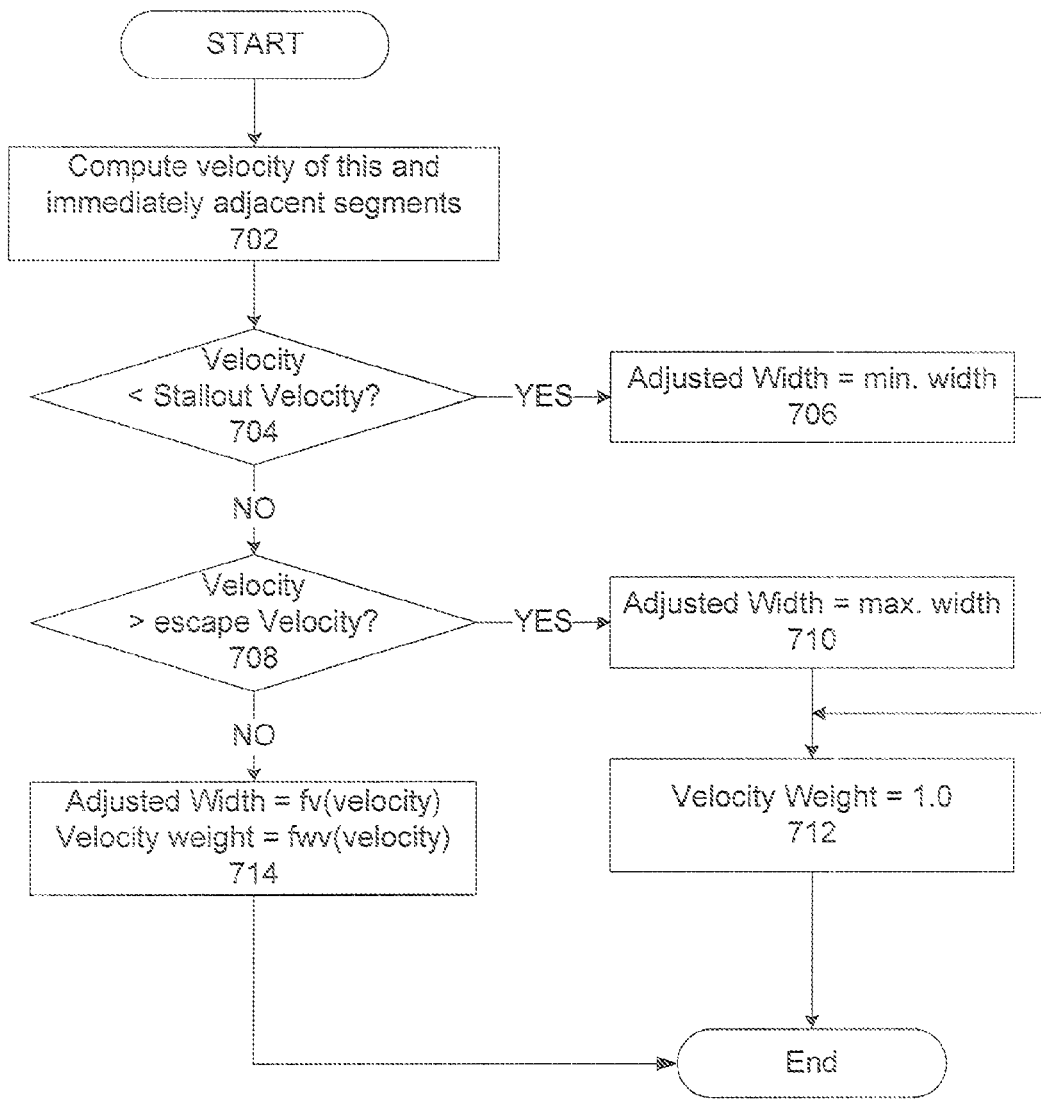
FIG. 7 is a flow chart of an embodiment of a method for varying line width based on velocity in accordance with the present invention.

Referring now to FIG. 7, an embodiment of a method for varying line width based on velocity at which the stroke was input will be described. The method begins by computing 702 the velocity of this and the immediately adjacent segments. In one embodiment, this calculation is performed in real time as the input is received from the user. In such a case, only the segments preceding the segment for which the velocity is being calculated can be used in the velocity calculation. However, if the processing is done after (whether it is immediately after or significantly later) the strokes have been captured, then the segments preceding and following the selected segment can be used in the velocity calculation. In one embodiment, velocity calculation is simply the length of the segment divided by the time from the beginning of the segment to the end of the segment. Once the velocity has been calculated, the method proceeds to determine 704 whether the velocity for this segment is less than the "stall out" velocity. If so the adjusted width is set 706 to be the minimum width for the segment since there is a predetermined default threshold thickness below which no segment can fall. After the adjusted width set to be the minimum width, the method proceeds to step 712 and assigns velocity weight of 1.0. If the velocity for this segment is determined to be greater than the stall out velocity in step 704, the method proceeds to step 708. In step 708, the method determines whether the velocity for this segment is greater than the "escape velocity." If so the velocity is beyond an amount for which the width of the stroke will be increased, and the method sets 710 the adjusted width for the stroke segment equal to the maximum width. After step 710 the method continues in step 712 to set the velocity weight equal to one. The present invention advantageously provides both a width value and a level of confidence (velocity weight) for that width value. In an embodiment, the confidence value ranges between zero and 1. Since in both step 706 and step 710 the velocity has either exceeded the maximum or is below the minimum, the velocity weight or confidence level is set to one.

If the velocity of the segment is not greater than the escape velocity in step 708, the stroke velocity is within a range which can be adjusted according to a function that makes the width greater in proportion to the velocity. More specifically, if the stroke was rapidly drawn, it's velocity will be greater than if it was slowly drawn. Thus in general, the method of the present invention will make segments that are rapidly drawn wider than segments that are slowly drawn. The method proceeds to step 714 in which the adjusted width is set to be a function of the velocity and the velocity weight is also set to be a function of the velocity. The example provided above in which a more rapidly drawn stroke produces a wider line is just one example of how the line width may be varied according to the velocity at which the segment was captured. Those skilled in the art will recognize that there could be a variety of different functions for calculating the adjusted width and the velocity weight. A system that was interested in simulating a calligraphic brush might behave just the opposite, drawing a thin line for a rapid stroke and a thick one to simulate the bleeding due to slow brush movement. After either step 714 or 712 to the method is complete and ends.

Figure 8:
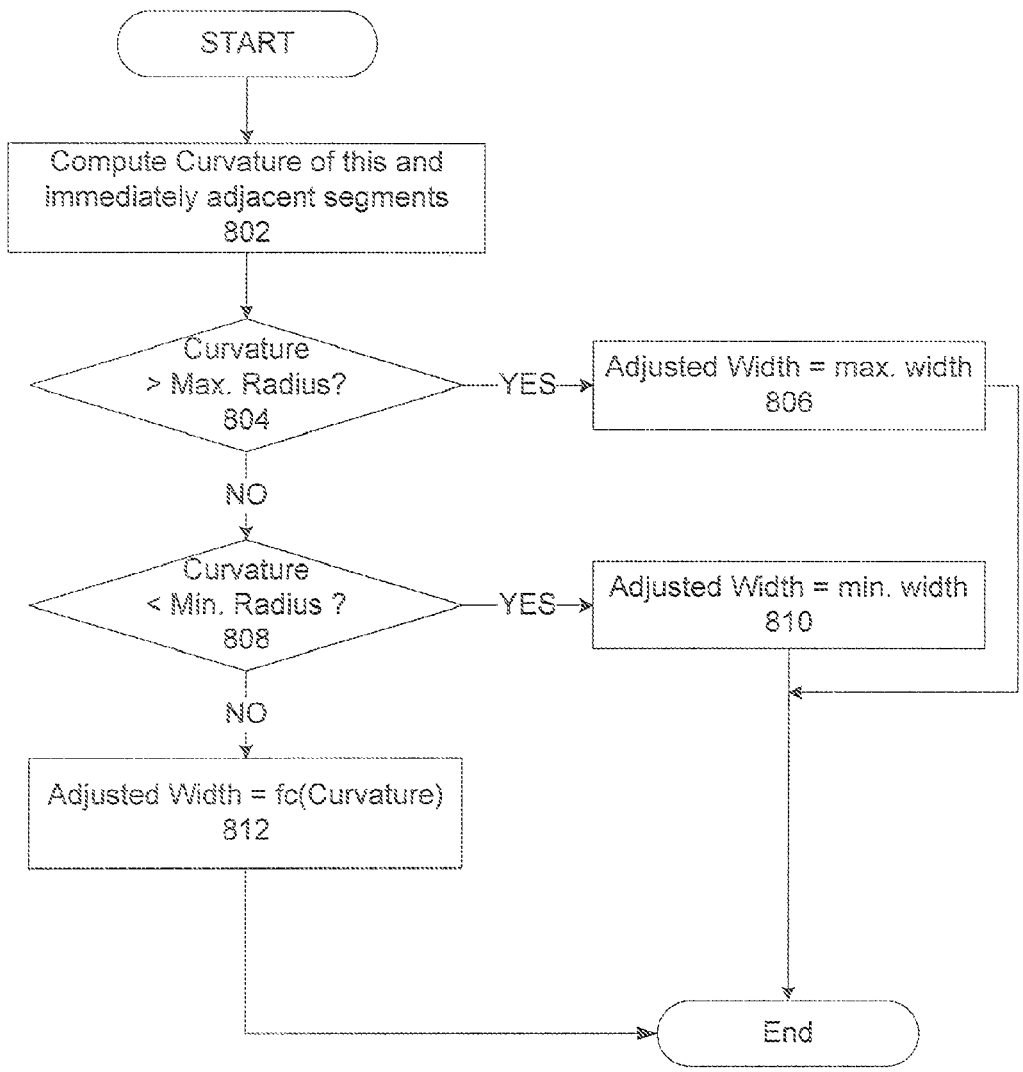
FIG. 8 is a flow chart of an embodiment of a method for varying line width based on curvature in accordance with the present invention.

Referring now to FIG. 8, a method for adjusting the line width based on the curvature of the segments will be described. The method begins by computing 802 the curvature of this and immediately adjacent segments. In one embodiment the curvature is given by the "radius of curvature," which is found by determining the perpendicular bisector of adjacent segments and calculating its distance from the segments. In one embodiment the segments used in determining the radius of curvature are not actually the segments of the stroke, but the segments between stroke segments midpoints, thus somewhat smoothing out the stroke. The curvature computation in one embodiment includes a low pass filtering that reduces the effect of very short segments introduced by the styles position sampling system. In one embodiment, the radius of curvature of a given region of a stroke is averaged over several adjacent segments, further reducing sampling artifacts. As has been noted above for velocity, the curvature adjustment may also be calculated on a real-time basis or after all the segments have been captured. Depending on when the processing takes place, the method may use only prior segments in addition to the current segment, or both preceding and following segments in addition to the current segment in the curvature adjustment calculation. After the curvature for this and the adjacent segments has been determined, the method determines 804 whether the curvature is greater than the maximum radius (e.g., the line is relatively straight). If so the adjusted width is set 806 to the maximum width and the method is complete. If not the method continues to determine 808 whether the curvature is less than the minimum radius (e.g., the region is highly inflected, i.e. very kinky). If so the adjusted width is set 810 to the minimum width for a segment, and the method is complete and ends. In general, this method makes highly inflected portions of line segments thinner. If the curvature computed for this segment is between the maximum radius and the minimum radius then the method proceeds to step 812 and calculates as a function of the curvature, a width somewhere between the minimum and the maximum. One such function would simply map the curvature values between the minimum radius of curvature and the maximum radius of curvature linearly into the width values between the minimum segment width and the maximum segment width. Others might employ a smoother curve function.

Figure 9A:
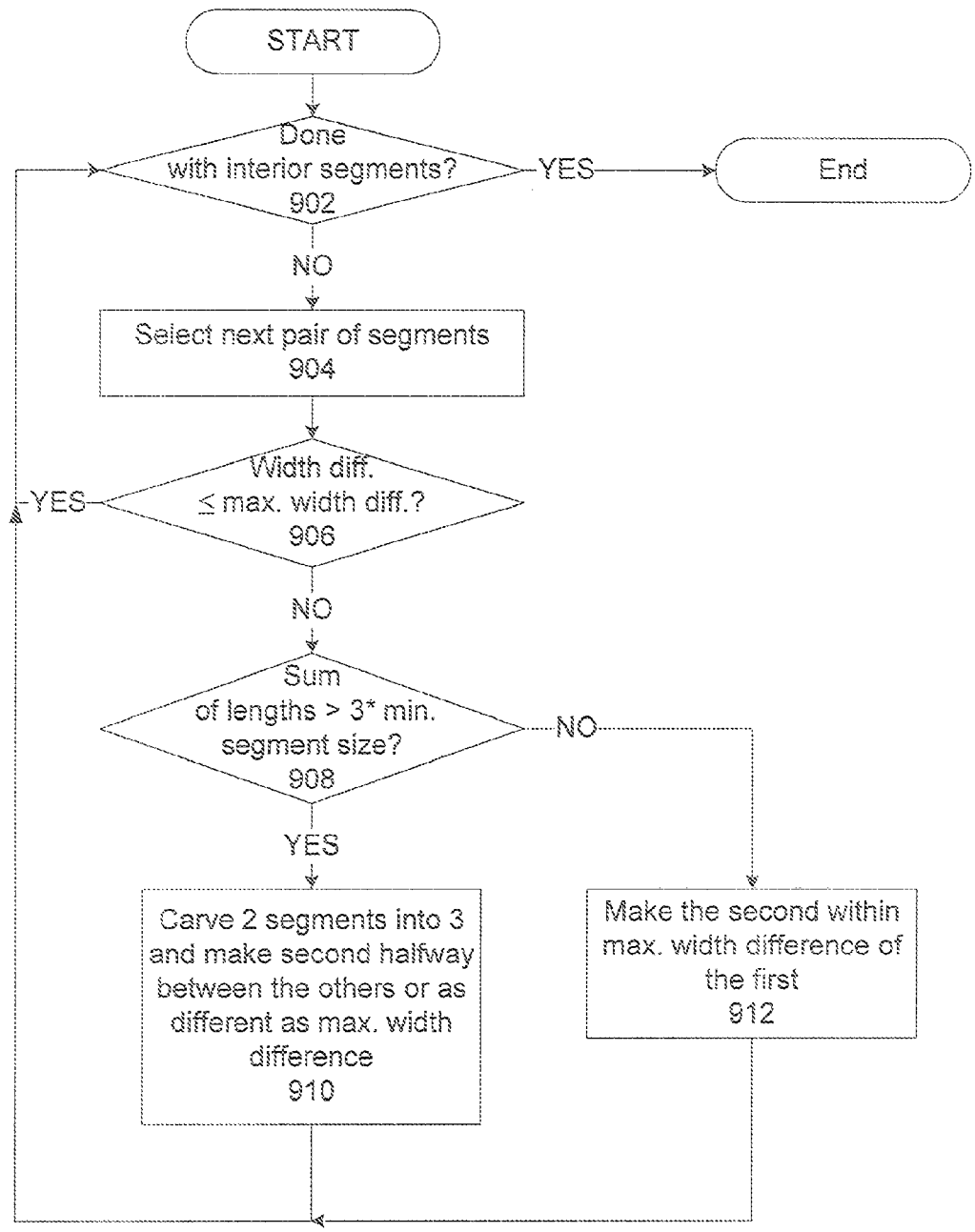
FIG. 9A is a flowchart of an embodiment of a method for smoothing interior segments in accordance with the present invention.

The process for smoothing segments includes both the smoothing of interior segments and the smoothing of end segments. In general, the present invention smoothes the strokes by adjusting the width of each segment to not vary too greatly from that of adjacent segments. Referring now to FIG. 9A, an embodiment of a method for smoothing interior segments in accordance with the present invention will be described. The process begins by determining 902 whether the processing of interior segments is complete. If so the method is complete and ends. If there are additional interior segments to smooth, the method continues by selecting 904 a next pair of segments. The method then determines 906 whether the width difference between the segments is less than or equal to the maximum width difference between segments allowed by the present invention. If that is the case, no additional smoothing needs to be undertaken between these two segments and a method returns to step 902 to determine whether there are any additional interior segments that need to be smoothed. On the other hand, if the width difference between the two segments is greater than the maximum allowed width difference, we would like to carve these two segments into three for the purpose of smoothing out the width transition. Thus the method determines 908 whether the sum of the lengths of the selected pair of segments is greater than three times the minimum segment size for width smoothing. If so the method of the present invention divides 910 the two segments into three segments, and the middle segment has its width sets halfway between the widths of the other two segments or as different as the maximum width difference. If the sum of the segment lengths is not greater than three times the minimum segment size, the method modifies 912 the second to fall within the maximum width difference of the first. After either step 910 and 912, the method returns to step 902 to determine whether there remain additional interior segments to process.

Figure 9B:
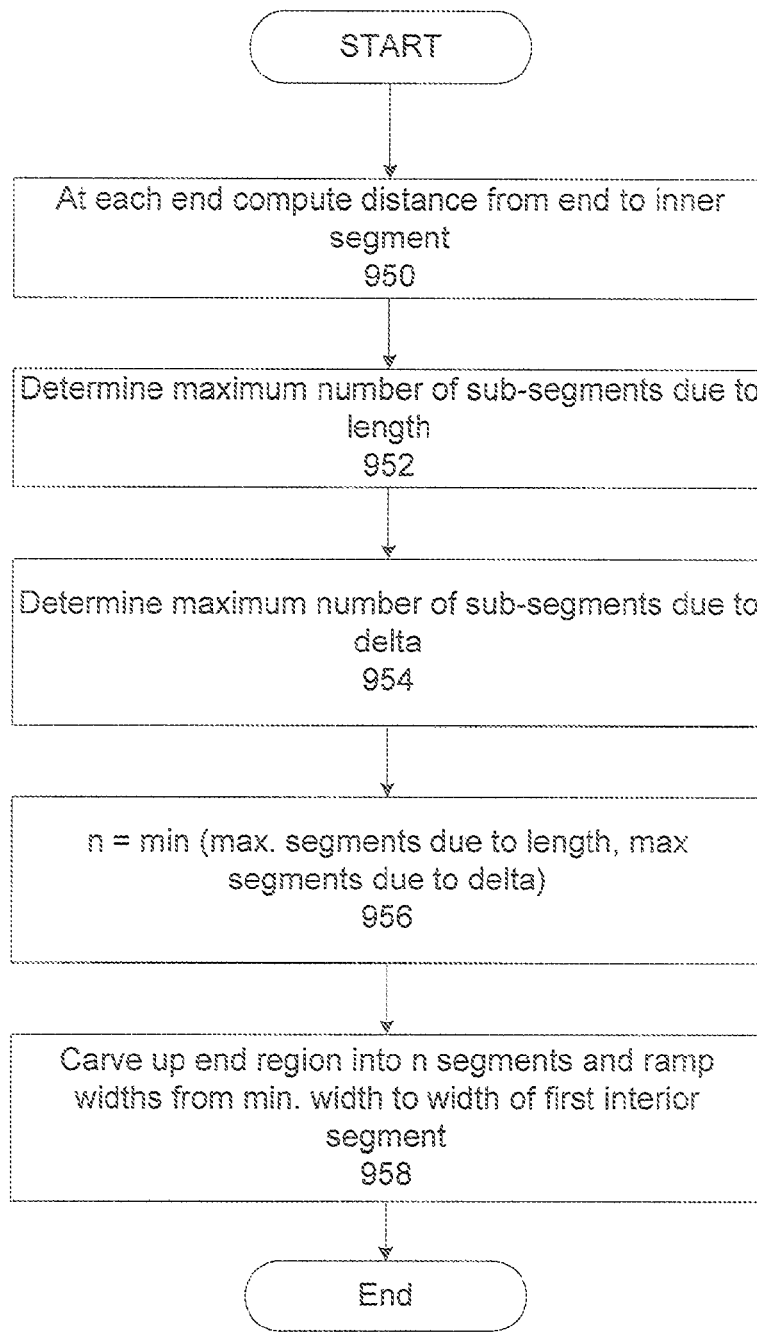
FIG. 9B is a flowchart of an embodiment of a method for smoothing end segments in accordance with the present invention.

Referring now to FIG. 9B, an embodiment of a method for smoothing end segments in accordance with the present invention will be described. In general, the end segments are smoothed by dividing the end segment into smaller sub-segments. The process begins by computing 950 at each end segment the distance from the end to the inner segment. The method then determines 952 the maximum number of sub-segments due to length. The maximum number of sub-segments due to length is determined by dividing the end distance by the minimum sub-segment length for smoothing. The end distance was calculated in step 950. Within the end smoothing process there is a minimum sub-segment length that each sub-segment must have. Therefore, the segment is limited as to the maximum number of sub-segments into which it can be divided. Next, the method determines 954 the maximum number of sub-segments into which we would like to divide the segment in order to do the necessary amount of smoothing. There is a "width delta" equal to the difference between the width of the first interior segment and the minimum segment width. Using this width delta, the maximum number of sub-segments due to the delta can be determined by dividing the width delta by the maximum inter-segment width delta. This gives an indication of how many sub-segments we want to divide the segment into in order to smooth out the width differences between segments. The method continues to determine 956 a number, n, of sub-segments into which the segment will be divided. In one embodiment, the number n is set to be the minimum of the maximum number of sub-segments due to length and the maximum number of sub-segments due to delta. The method continues by dividing 958 up the end region into n sub-segments and smoothly ramping the widths of the n sub-segments from the minimum width to the width of the first interior segment.

Figure 10:
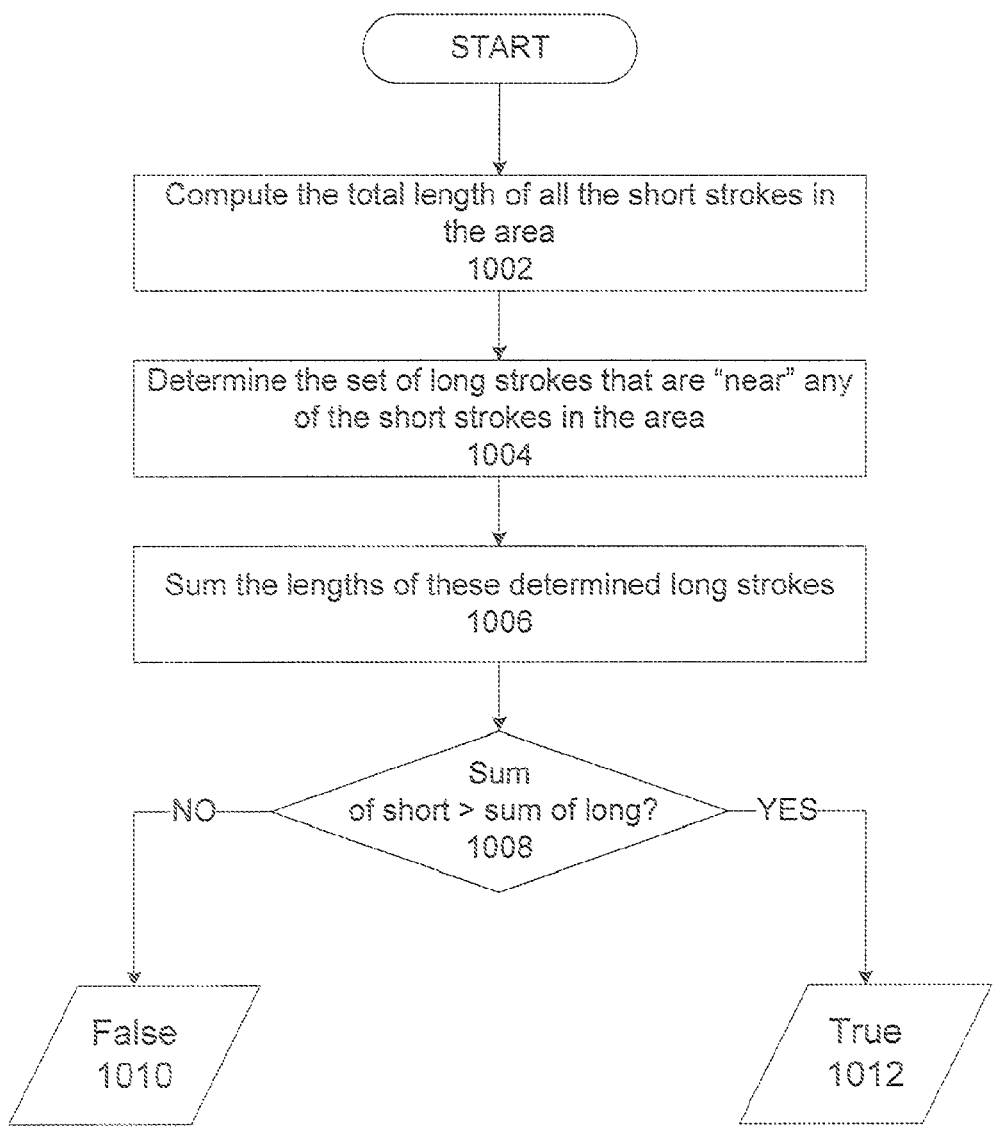
FIG. 10 is a flowchart of an embodiment of a method for computing dominance of a group in an area in accordance with the present invention.
Figure 12:
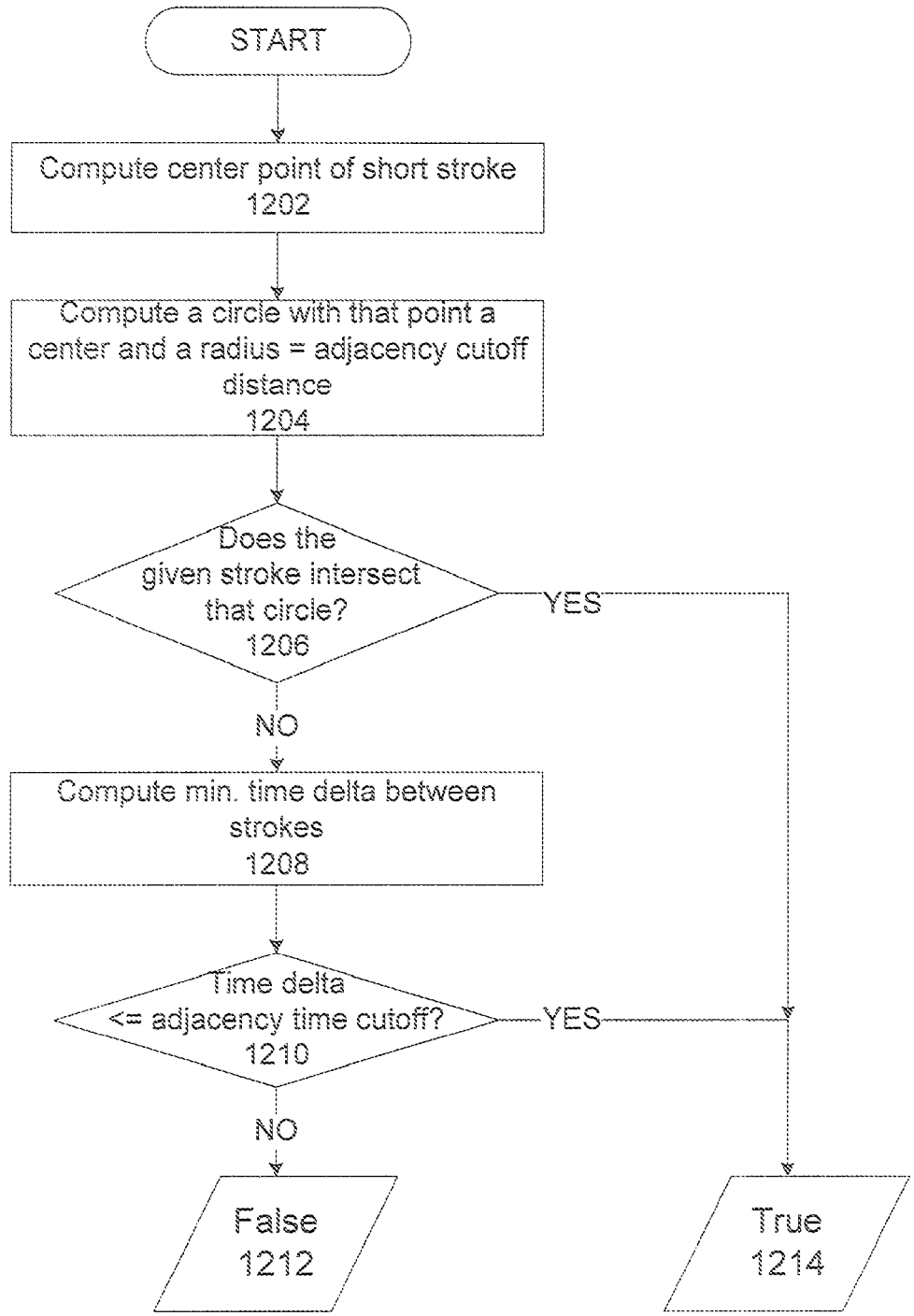
FIG. 12 is a flowchart of an embodiment of a method for computing nearness of a stroke to a short stroke in accordance with the present invention.

Referring now to FIG. 10, an embodiment of a method for computing "dominance" of a group of strokes in an area in accordance with the present invention will be described. The process begins in step 1002 by computing the total length of all those short strokes in the area. The method then determines 1000 the set of long strokes that are "near" any of the short strokes in the area. A method for determining whether strokes are "near" other strokes is shown in FIG. 12 and will be described below. The length of the set of long strokes determined in step 1004 are then summed 1006. Next method determines 1008 whether the sum of the lengths of the short strokes from step 1002 is greater than the sum of the lengths of the long strokes from step 1006. If so the method determines that the short strokes are dominant and outputs TRUE in step 1012. If not, the method has determined that the short strokes are not dominant and outputs FALSE in step 1010.

Figure 11:
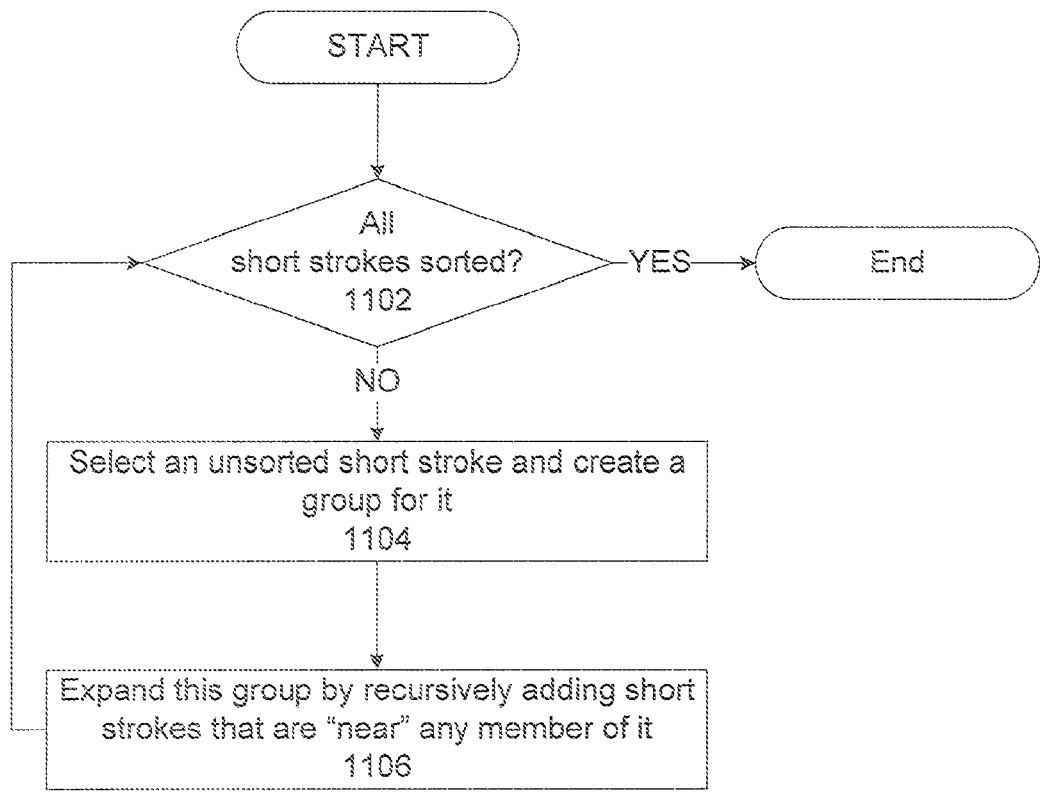
FIG. 11 is a flowchart of an embodiment of a method for partitioning short strokes into adjacency groups in accordance with the present invention.

Referring now to FIG. 11, an embodiment of a method for partitioning short strokes into adjacency groups in accordance with the present invention will be described. The method begins by determining 1102 whether all the short strokes have been sorted. If so, the process is complete and ends. If not, the method continues and selects 1104 an unsorted short stroke and creates a group for it. Next the method expands 1106 this group by recursively adding short strokes that are "near" any member of it. Once step 1106 has been completed, the process continues to step 1102 to determine whether all strokes have been sorted.

Referring now to FIG. 12, an embodiment of a method for computing nearness of a stroke to another stroke in accordance with the present invention will be described. The process begins by computing 1202 the center point of a short stroke. The method then computes a circle with that point at the center and a radius equal to the adjacency cut off distance. The adjacency cut off distance is a predetermined threshold that indicates whether strokes will be considered to be "near" each other or not. The method of the present invention assumes that strokes are near each other if they are within a predefined distance of each other. Next the method determines 1206 whether a given stroke intersects the circle defined in step 1204. If so, the strokes are considered to be "near" each other, and TRUE 1214 is output. If the stroke does not intersect the circle defined in step 1204, the method computes 1208 the minimum time delta between strokes. Then the method determines 1210 whether the time delta calculated in step 1208 is less than or equal to the adjacency time cut off. In addition to considering strokes to be near each other based on distance, the present invention also considers strokes to be near each other if they were input at about the same time. The adjacency time cut off provides the threshold by which strokes will be determined to be "near" each other in time. If the time delta of step 1208 is less than or equal to the adjacency time cut off, the strokes are near each other and the method continues and outputs TRUE 1214. On the other hand if the time delta of step 1208 is greater than the time adjacency cut off the strokes are not considered to be near each other and the method continues to output FALSE 1212.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A system for varying hand-drawn line width for display, the system comprising:
   a processor for receiving a plurality of strokes and processing the plurality of strokes for display;
   a display device for displaying hand-drawn lines, the display device coupled to the processor; and
   a stroke control module, coupled to the processor, for partitioning the plurality of strokes into a first group of long strokes and a second group of short strokes, the first group of long strokes having a first characteristic and the second group of short strokes having a second characteristic, the first characteristic being different from the second characteristic, the stroke control module partitioning the second group of short strokes into at least one adjacency group, determining a dominance of the at least one adjacency group, and assigning a width to the short strokes in the at least one adjacency group as a function of an average length of the short strokes in the at least one adjacency group.

2. The system of claim 1 wherein the stroke control module is configured for retrieving a selected stroke having a width from the first group of long strokes, and modifying the width of the selected stroke as a function of the first characteristic to provide a desired effect, and consistent with other strokes in the first group of long strokes.

3. The system of claim 2 wherein the stroke control module modifies the width of the selected stroke by varying amounts along a length of the selected stroke.

4. The system of claim 2 wherein the desired effect is that the selected stroke has a paper-like effect.

5. The system of claim 2 wherein the first characteristic is a geometric or temporal property of the selected stroke.

6. The system of claim 2 further comprising a velocity adjustment module for adjusting the width of the selected stroke based on an input velocity at which the selected stroke was input, the velocity adjustment module coupled to the processor.

7. The system of claim 2 further comprising a curvature adjustment module for adjusting the width of the selected stroke based on a curvature of the selected stroke, the curvature adjustment module coupled to the processor.

8. The system of claim 2 wherein the selected stroke includes an interior segment and an end segment, and the system comprising a smoothing module for modifying the selected stroke width to smooth a transition between the end segment and the interior segment, the smoothing module coupled to the processor.

9. The system of claim 1 wherein the stroke control module adaptively modifies the width of the long strokes in the first group or short strokes in the second group based on user context.

10. The system of claim 1 further comprising an adjacency identification module for identifying a first stroke adjacent to a second stroke and adjusting widths of the first and second stroke to be similar, the adjacency identification module coupled to the processor.

11. A method for varying hand-drawn line width for display, the method using a computer to perform steps comprising:
  receiving a plurality of strokes;
  partitioning using a stroke control module, the plurality of strokes into a first group of long strokes and a second group of short strokes, the first group of long strokes having a first characteristic and the second group of short strokes having a second characteristic, the first characteristic being different from the second characteristic;
  partitioning using a stroke control module, the second group of short strokes into at least one adjacency group;
  determining a dominance of the at least one adjacency group; and
  assigning a width to the short strokes in the at least one adjacency group as a function of an average length of the short strokes in the at least one adjacency group.

12. The method of claim 11 comprising:
  retrieving a selected stroke having a width from the first group of long strokes; and
  modifying the width of the selected stroke as a function of the first characteristic to provide a desired effect, and consistent with other strokes in the first group of long strokes.

13. The method of claim 12 wherein modifying the width of the selected stroke includes varying the width of the selected stroke by amounts along a length of the selected stroke.

14. The method of claim 12 wherein the desired effect is that the selected stroke has a paper-like effect.

15. The method of claim 12 wherein the first characteristic is a geometric or temporal property of the selected stroke.

16. The method of claim 12, further comprising tapering an end of the selected stroke.

17. The method of claim 12, wherein modifying the width of the selected stroke to provide a desired effect includes modifying the width of the selected stroke as a function of its curvature.

18. The method of claim 12, wherein modifying the width of the selected stroke to provide a desired effect includes modifying the width of the selected stroke as a function of a velocity at which the selected stroke was input.

19. The method of claim 12, wherein modifying the width of the selected stroke to provide a desired effect includes modifying the width of the selected stroke as a function of a velocity at which the selected stroke was input and as a function of its curvature.

20. The method of claim 12, comprising a step of smoothing at least one segment forming the selected stroke.

21. The method of claim 12, wherein the steps of retrieving and modifying are performed in real time with the step of receiving.

22. The method of claim 12, wherein the steps of retrieving and modifying are performed at a predetermined time after the step of receiving.

23. The method of claim 11, comprising:
  determining a width of at least one long stroke in an area near the at least one adjacency group; and
  assigning a width equal to a width of the long stroke to the group of short strokes in the at least one adjacency group.

24. The method of claim 23, wherein the step of determining the width comprises determining widths of a plurality of long strokes and determining an average of widths of the plurality of long strokes;
  and wherein the assigning a width uses the average of the widths.

25. The method of claim 11, wherein partitioning the second group of short strokes into at least one adjacency group is performed by identifying strokes that are temporally or physically nearby other strokes.

26. The method of claim 11, wherein determining dominance of the at least one adjacency group includes:
  determining a first total length of the strokes in the at least one adjacency group;
  determining a second total length of long strokes in an area near the at least one adjacency group;
  setting the at least one adjacency group as dominant if the first total length is greater than the second total length.

27. The method of claim 11, comprising storing the plurality of strokes and re-computing and re-assigning the width of the short strokes based on more complete information about other segments and strokes.

* * * * *